Patented Nov. 4, 1924.

1,514,494

UNITED STATES PATENT OFFICE.

GLEN LENARDO WILLIAMS, OF DETROIT, MICHIGAN, ASSIGNOR TO RANDALL WILLIAMS COMPANY, OF DETROIT, MICHIGAN, A CORPORATION OF MICHIGAN.

RUST REMOVER AND PREVENTATIVE.

No Drawing.   Application filed May 29, 1922.   Serial No. 564,655.

*To all whom it may concern:*

Be it known that I, GLEN LENARDO WILLIAMS, a citizen of the United States of America, residing in the city of Detroit, in the county of Wayne, in the State of Michigan, have invented certain new and useful Improvements in Rust Removers and Preventatives, of which the following is a specification.

The object of the invention is to produce a liquid which will remove rust from steel or sheet iron.

A further object of the invention is to provide a liquid which will leave a rust-preventing film behind on the iron surface after the removal of the rust, so that further rusting of the metal will be hindered for a considerable time.

A preferred method of preparing the liquid, is to dissolve in water the phosphates of nickel, copper, zinc, or manganese. I may use any one of these separately or any combination of the four salts mentioned. To the solution, a mixture of nitric and hydrochloric acid (aqua regia) is added, and then before the acid has acted upon the salt solution, a sugar factory residue consisting of an evaporated Steffins waste water is added. This sugar factory residue is alkaline in reaction and contains colloidal cellulose with other organic matter, especially certain of the saccharoses.

When the solution is formed in this manner, it forms a liquid which when heated to substantially the boiling point will act upon rusted iron or sheet steel placed within the solution to first remove the rust and then to form a uniform dark coating which is a very satisfactory rust resisting substance.

In another method of combining the same ingredients the sugar factory residue is thinned down with water to about 3° Baumé to 6° Baumé, then the metallic salts are added to the solution and dissolved, and then enough aqua regia is added to make the liquid acid. A liquid so produced forms an excellent rust remover, though its action as a rust preventative is not so good as when the materials are combined according to the first method.

Since the residue liquor differs in alkalinity at different times, exact weights and volumes cannot be given, but with each lot of residue liquor, a sufficient amount of acid and of the metallic salt must be added to produce the desired result upon the type of metal to be cleaned or rust proofed, this being very readily determined by experiment. The sugar factory residue contains salts of sodium, potassium, and calcium which are electro-negative to iron, and the effect of this comparatively small amount of such salts, appears to assist in removing the rust from the iron, while the copper, manganese, zinc and nickel being electro-positive to iron, react with the metal being cleaned, either to form a part of the film when the metal is dipped in the boiling solution, or to form a slight metallic coating on the surface when used merely as a rust remover.

Of the metallic phosphates, when the copper salt is mixed with the manganese salt in substantially equal proportions, the preventative surface will have a pinkish color which will oxidize to a brownish pink tint, the phosphates entering into combination with the surface of the iron to form a compound which apparently oxidizes to form a magnetic oxide of iron containing copper and manganese. When this film surface is analyzed, no phosphates are found. This surface prevents the iron from forming the hydrated iron oxide which constitutes rust. The treatment may be repeated or the material may be left in the solution for a greater or less length of time, according to the nature of the article and the amount of protection required.

The liquid is a water soluble solution which carries a colloidal cellulose combined with the metal or metals and the acids, and when this solution is allowed to evaporate on the surface of the metal, it dries into a viscous film which will act to protect the metal from corrosion, even when the metal has not been treated with a hot solution for a sufficient length of time to produce the oxide coating.

I claim:—

1. A liquid for removing rust and for producing a rust preventative coating, containing sugar factory refuse, aqua regia, and a phosphate of a metal electro-positive to iron.

2. A liquid for removing rust and retarding corrosion of iron which consists of a dilute solution of sugar factory refuse to which has been added a phosphate of a metal electro-positive to iron, made acid with aqua regia.

3. A liquid for removing rust and retarding corrosion of iron which consists of a dilute solution of sugar factory refuse made acid with aqua regia and containing manganese phosphate.

4. The method of preventing the oxidation or iron or steel, consisting in forming thereon a rust preventing deposit containing iron and another metal electro-positive to iron by subjecting the iron or steel to the action of a liquid containing aqua regia, sugar factory residue, and the phosphate of a metal electro-positive to iron.

Signed the 7th day of April, 1922, in the city of Detroit, in the county of Wayne, State of Michigan.

GLEN LENARDO WILLIAMS. [L. S.]